Oct. 15, 1968

R. H. JOHNSTON 3,405,779

VEHICLE SPEED CONTROL SYSTEM

Filed Dec. 9, 1966

INVENTOR.
BY Ralph H. Johnston
Albert F. Duke
ATTORNEY

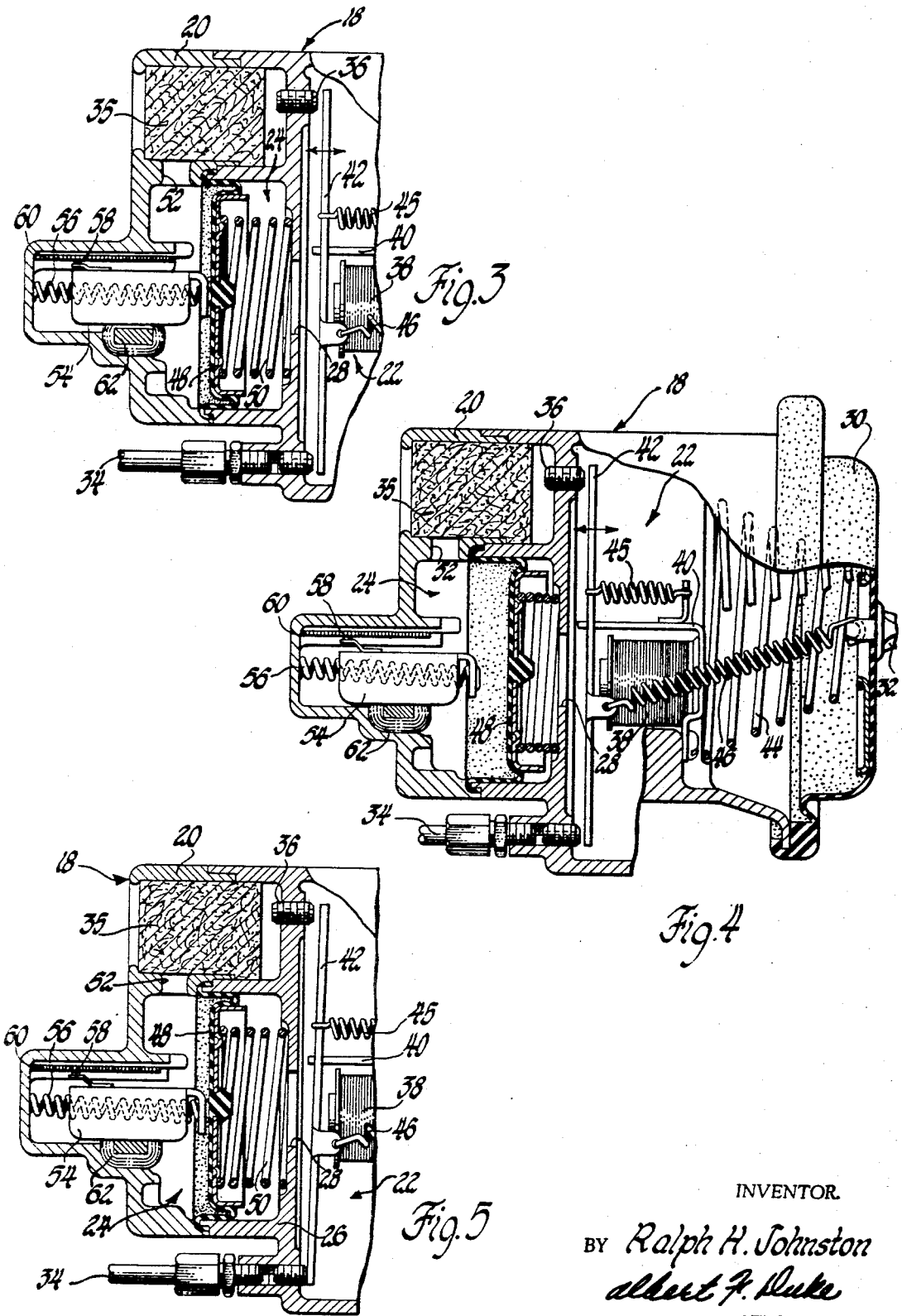

United States Patent Office 3,405,779
Patented Oct. 15, 1968

3,405,779
VEHICLE SPEED CONTROL SYSTEM
Ralph H. Johnston, Anderson, Ind., assignor to General Motors Corporation, Detroit, Mich., a corporation of Delaware
Filed Dec. 9, 1966, Ser. No. 600,493
5 Claims. (Cl. 180—108)

This invention relates to vehicle speed control systems, and more particularly to a cruise control system including throttle actuator means for automatically placing the system in a cruise mode of operation at the prevailing vehicle speed.

The present invention is an improved cruise control system of the type disclosed in copending U.S. patent application, Ser. No. 472,588, filed July 16, 1965, now Patent No. 3,319,733, and assigned to the assignee of the present invention. In the aforementioned application, control circuitry is responsive to a prevailing speed input from a speed sensor and generator and to a desired speed input from a manually adjustable rheostat. The circuitry develops a control signal representing the difference between the two inputs which is applied to a throttle actuator for maintaining the prevailing vehicle speed at the desired vehicle speed.

In accordance with the present invention a dual diaphragm throttle actuator is provided which includes a rheostat adjustable in response to movement of one of the diaphragms so that the desired vehicle speed input to the control circuitry is the prevailing vehicle speed at the time of energization of the system. Means are provided for maintaining the desired vehicle speed input constant after energization of the system to develop a speed error signal in response to prevailing vehicle speed changes. The other diaphragm is connected to the throttle and is positioned in response to this error signal to maintain the prevailing vehicle speed at the desired vehicle speed. In addition to automatically setting the desired speed input to the control circuitry the present system may be deenergized without affecting the last set desired speed input permitting subsequent reenergization of the system to reestablish the last set speed.

A more complete understanding of the present invention may be had from the following detailed description which should be read in conjunction with the drawings in which:

FIGURES 3, 4 and 5 show the position of the elements of the actuator during various phases of system operation.

Figure 1:
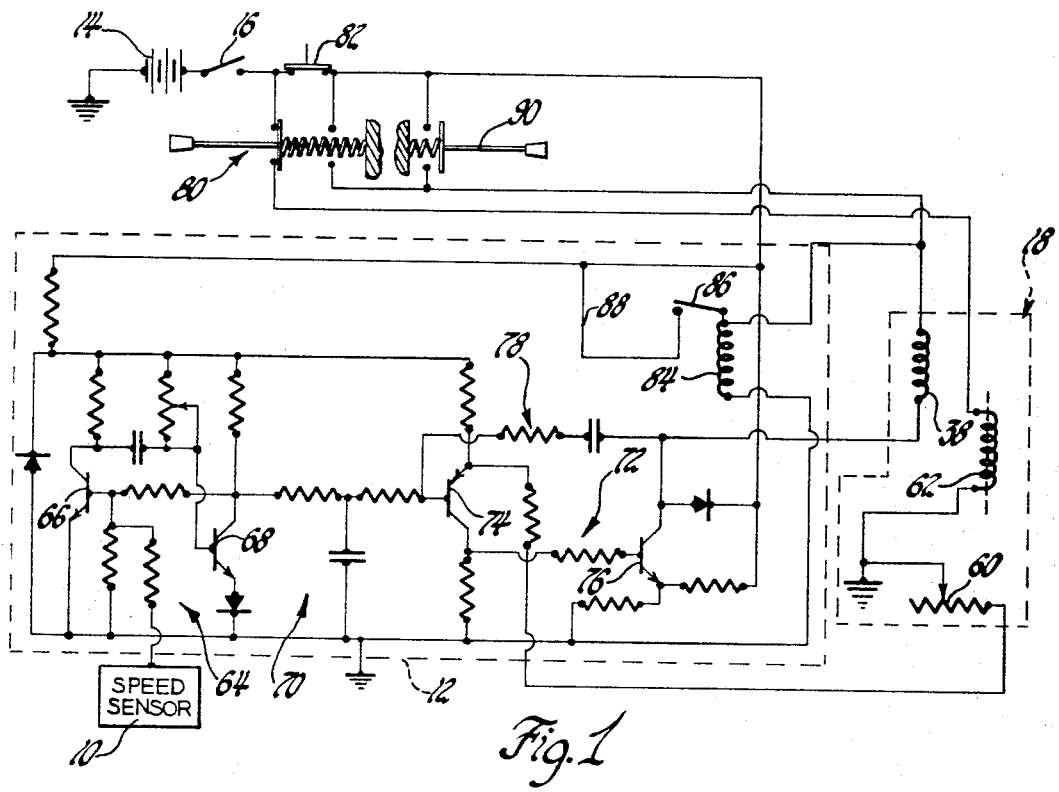
FIGURE 1 is a schematic diagram of the speed control system.

Referring now to the drawings and initially to FIGURE 1, the cruise control system of the present invention comprises a speed sensor and signal generator 10 feeding control circuitry 12 which is supplied from a source such as the vehicle battery 14 through an ignition switch 16. The generator 10 may be a permanent magnet pulse generator of the type disclosed in the aforementioned application or any other device suitable for generating a signal the frequency of which is proportional to engine or vehicle speed. The control circuitry 12 is adapted to control a throttle actuator 18 in response to the signal received from the generator 10.

Figure 2:
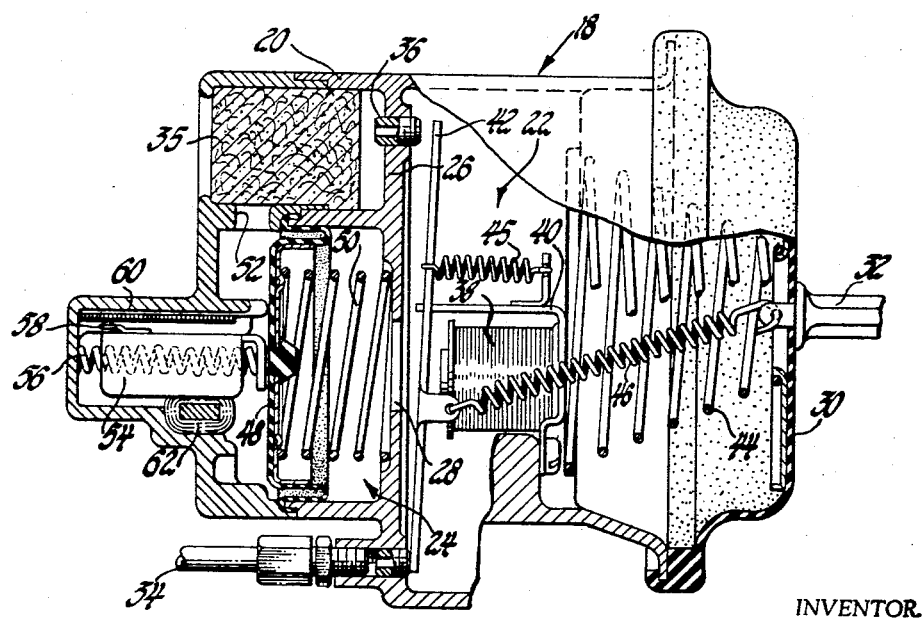
FIGURE 2 is a sectional view of the dual diaphragm actuator of the present system.

Referring now to FIGURE 2, the throttle actuator 18 includes a housing 20 separated into two compartments 22 and 24 by a bulkhead 26 having an opening 28 for communication between the compartments. Compartment 22 is closed by a flexible diaphragm 30 which is secured to a rod 32 controlling the carburetor throttle. The compartment 22 is supplied with engine manifold vacuum through a vacuum port 34 and with air through a filter 35 and an air port 36. An electromagnetic control valve assembly including a vacuum control coil 38 is supported by a frame 40 which also supports an armature 42 in a "teeter-totter" fashion. The armature opens and closes the vacuum port 34 in response to energization and deenergization respectively of the coil 38. The on and off time relationship of the coil 38 establishes the vacuum level within the compartments 22 and 24. A spring 44 preloads the diaphragm 30 in a throttle closing direction while a spring 45 biases the armature 42 in a direction to close the vacuum port 34. A feedback spring 46 is connected between the rod 32 and the armature 42 and provides an additional biasing force on the armature 42 which is related to the position of the diaphragm 30 and consequently the carburetor throttle. This throttle position feedback contributes to stability of the system.

Compartment 24 has a speed set diaphragm 48 which is biased away from the bulkhead 26 by a spring 50. An opening 52 permits atmospheric pressure to exist on one side of the diaphragm 48 while the other side of the diaphragm 48 is exposed to the vacuum level in compartment 22. Movement of the diaphragm 48 is transferred to a speed set carrier 54 biased toward the diaphragm 48 by a spring 56. The carrier 54 carries a wiper contact 58 for a rheostat 60. The rheostat 60 is a variable resistor which provides the speed set reference for the control circuitry 12 as will be more fully explained hereinafter. The carrier 54 may be locked in position by energization of a speed set locking coil 62.

Referring again to FIGURE 1, the control circuitry 12 includes a multivibrator 64 comprising transistors 66 and 68. The transitsor 68 which is normally biased on is turned off for a finite interval whenever transistor 66 is turned on. Transistor 66 is turned on by positive pulses from the speed sensor and signal generator 10 and the frequency of the pulses across transistor 68 is proportional to the speed of the vehicle. An R-C filter 70 integrates the pulses developing a D-C voltage which is proportional to vehicle speed which is fed to a two-stage amplifier 72 including transistors 74 and 76. Transistor 74 is normally biased on and the voltage appearing at the emitter of the transistor 74 which is determined by the setting of the rheostat 60 determines the voltage required at the base of the transistor 74 required to turn the transistor 74 off. The base voltage required to turn off the transistor 74 increases as a resistance setting of the rheostat 60 is increased. Since the voltage appearing at the base of transistor 74 is proportional to vehicle speed, the transistor 74 is turned off when the set vehicle speed as represented by the rheostat setting is reached. Transistor 76 is controlled by transistor 74 being on when transistor 74 is on and off when transistor 74 is off. The load on the collector of transistor 76 is the vacuum control coil 38. A feedback circuit 78 is connected between the collector of transistor 76 and the base of transistor 74 such that oscillations of the circuit occur at a frequency determined by the resistor and capacitor in the feedback circuit. The frequency of oscillation is set at the highest frequency that the control valve armature 42 will follow consistently. The application of this oscillatory voltage to the control coil 38 tends to stabilize the operation of the system by linearizing the operation of the valve and reducing the electromagnetic hysteresis of the valve assembly while operating within the limits of control capability.

A momentary engage switch 80 normally connects the battery 14 to the speed set locking coil 62, but is adapted to close a circuit through a brake pedal actuated switch 82 to an engage coil 84 and the vacuum control coil 38. Upon release of the switch 80 the coils 38 and 84 are maintained in an energized condition through the switch 82, a conductor 88 and an armature 86 of the engage coil 84.

Operation

With the engine off and all power removed the actuator and the components assume the position shown in FIGURE 2. There is no vacuum in the actuator and both of the diaphragms 30 and 48 are fully extended by their return springs 44 and 50, respectively. The armature 42 is held in position with the vacuum port 34 closed by the action of spring 45. The speed set locking coil 62 is deenergized and the speed set carrier 54 being released is forced by the spring 50 working through the diaphragm 48 to its fully retracted position. This corresponds to the maximum speed setting.

When the ignition switch 16 is turned on prior to engine start the locking coil 62 is energized pulling the speed set carrier 54 down to the pole piece and holds it in the fully retracted position. The vacuum port 34 is closed and the air port 36 is open and no vacuum can be developed within the actuator.

If the vehicle operator desires to place the system in a cruise mode of operation at the prevailing vehicle speed the engage switch 80 is depressed which removes power from the locking coil 62 freeing the speed set carrier 54. In addition, the vacuum control coil 38 is connected to the output circuit of the transistor 76. Prior to being released the speed set carrier 54 was in a position corresponding to the highest set speed so that assuming the prevailing vehicle speed is below the maximum, a large error signal exists in the control amplifier 72. Since the set speed is well above the prevailing vehicle speed, the error signal is in a direction to increase throttle. This signal in the vacuum control coil 38 causes the vacuum port 34 to be opened, the air port 36 to close, and engine vacuum causes the vacuum in the actuator to increase. This increasing vacuum would normally tend to open the throttle to raise the car speed to match the high set speed, but before the vacuum reaches a sufficient level to move the throttle the speed set diaphragm 48 begins to move away from the speed set carrier 54. The carrier is unlocked, however, so it follows the movement of the speed set diaphragm 48 being held against the diaphragm by the spring 56. Therefore, instead of the throttle being opened to raise the vehicle speed to match a set speed, the set speed is pulled down to match the prevailing vehicle speed. When the prevailing vehicle speed is reached as shown by the position of the actuator in FIGURE 3, the error is reduced to zero and the armature 42 oscillates back and forth to open and close the ports 34 and 36 for equal periods of time with no further change in vacuum taking place within the actuator. The vacuum under these conditions will be 0.3 to 0.5 inch of mercury which is still too low to move the throttle since this normally requires a vacuum of 2 to 3 inches of mercury. The events just described all occur within 0.3 to 0.4 second after the engage switch 80 is depressed so that they actually occur while the switch is being held down. One additional event occurs when the engage switch 80 is depressed, the engage relay 84 is energized and latches itself, keeping the vacuum control coil 38 connected to the control amplifier output circuit as long as the system is engaged even though the engage switch 80 is released. As the engage switch 80 is released, power is reapplied to the locking coil 62 holding the speed set carrier 54 at the position to which it had been moved to match the vehicle speed. In this manner the desired cruising speed is automatically set. As the speed error develops in the system due to changing vehicle speeds, the vacuum control coil 38 opens and closes the ports 34 and 36 to produce the vacuum required to move the throttle. When the speed error is reduced, this time by changing vehicle speed, the armature 42 will again be oscillating back and forth to open and close the ports 34 and 36 for equal periods of time but now the vacuum will be high enough to handle the throttle load. This vacuum is high enough to completely overcome the force of the spring 50 so the speed set diaphragm 48 is drawn away from the speed set carrier 54 and bottoms out against the bulkhead 26 as shown in FIGURE 4. This condition exists as long as the system is controlling vehicle speed. The system can be reset to a new higher speed by accelerating the vehicle to the new cruising speed and momentarily depressing the engage switch 80. Also, a new lower cruising speed may be obtained by depressing the engage switch 80 whereupon the vehicle speed will decrease. In each instance depression of the engage switch will unlock the carrier 54 and release of the engage switch will lock the carrier 54 at the then prevailing vehicle speed.

When the vehicle brake pedal is depressed the switch 82 removes all power from the system except the locking coil 62. This causes the engage relay 84 to open so that when the brake pedal is released the system does not reengage. The condition of the actuator is shown in FIGURE 5, after it has been disengaged by depressing the brake pedal. The vacuum control coil 38 has been disconnected from the control amplifier 72, the vacuum port 34 is closed, the air port 36 is open, the interior of the actuator has no vacuum present and the diaphragms are fully extended. Since in the disengagement process the locking coil 62 remains energized, the rheostat 60 is maintained at the resistance value corresponding to the speed at which it was last set. With an appropriate switch the system can be reengaged and the vehicle automatically taken back to that speed upon command of the operator. For example, a normally open switch 90 connected in shunt with the normally opened contacts of the engage switch 80 will provide a separate path for energizing the coils 38 and 84 without deenergizing the locking coil 62. Upon closure of the switch 90 the vehicle would automatically be accelerated to the last set speed as determined by the position of the rheostat 60.

It will be apparent from the above description that I have provided a cruise control system including means for automatically placing the system in a cruise mode of operation at the prevailing vehicle speed, for raising or lowering the cruising speed without brake pedal disengagement of the system, and for automatically resuming a previous cruising speed after disengagement of the system if such is desired.

While the invention has been described in terms of a preferred embodiment, this should not be construed in a limiting sense. Modifications and variations will now occur to those skilled in the art. For a definition of the invention reference is made to the appended claims.

What is claimed is:

1. A vehicle speed control actuator comprising fluid pressure control means, first fluid pressure responsive means for controlling the position of a vehicle throttle, variable resistor means, second fluid pressure responsive means for adjusting the resistance of said resistor means to a value corresponding to a prevailing vehicle speed in response to operation of said fluid pressure control means, means for maintaining said resistor means at the adjusted value independent of said second fluid pressure responsive means.

2. The actuator of claim 1 wherein said first and second fluid pressure responsive means include first and second flexible diaphragms respectively, each of said diaphragms being exposed to the atmosphere on one side thereof and normally biased in opposite directions to form a chamber therebetween.

3. The actuator of claim 2 wherein the variable resistor means includes a carrier plate supporting a wiper contact and spring means biasing said carrier plate toward said second diaphragm in a direction opposite the biased direction of said second diaphragm, the maintaining means including electromagnetic means operative on said carrier plate to prevent movement thereof.

4. A vehicle speed control system comprising control circuitry responsive to a prevailing speed input and a desired vehicle speed input to develop a control output indicative of the difference between said inputs, fluid pressure actuator means responsive to said output for controlling the speed of said vehicle and including first and second flexible diaphragms defining a fluid pressure chamber, said first diaphragm adapted to control the vehicle throttle in response to the fluid pressure existing in said chamber, variable resistor means for controlling said desired vehicle speed input, said second diaphragm adapted to adjust said variable resistor means to a value corresponding to the prevailing vehicle speed upon energization of said fluid pressure actuator means.

5. The system defined by claim 4 wherein said fluid pressure actuator means comprises electromagnetic valve control means for controlling the pressure in said chamber in response to said control output, said system further including normally closed brake pedal responsive switch means connecting said control circuitry to a source of power, additional electromagnetic means for maintaining said resistor means at a fixed value upon energization thereof, biased switch means normally connecting said additional electromagnetic means to said source of power, but adapted upon actuation to connect said electromagnetic valve control means to the output of said control circuitry and disconnect said additional electromagnetic means from said source, hold-in circuit means including said brake pedal responsive switch adapted to be energized by closure of said biased switch means, and additional switch means independent of said biased switch means for connecting said electromagnetic valve control means to said source.

References Cited

UNITED STATES PATENTS

| | | | |
|---|---|---|---|
| 2,883,975 | 4/1959 | Spetner | 123—102 |
| 3,070,185 | 12/1962 | Fales. | |
| 3,106,084 | 10/1963 | Hoffman et al. | 91—363 X |
| 3,291,246 | 12/1966 | Colling et al. | 180—106 X |
| 3,298,482 | 1/1967 | Mueller et al. | 180—106 X |
| 3,319,733 | 5/1967 | Rath et al. | 180—106 |
| 3,332,406 | 7/1967 | Perry et al. | |

KENNETH H. BETTS, *Primary Examiner.*